US009626156B2

(12) United States Patent
Hosono et al.

(10) Patent No.: US 9,626,156 B2
(45) Date of Patent: Apr. 18, 2017

(54) APPLICATION ARCHITECTURE DESIGN METHOD, APPLICATION ARCHITECTURE DESIGN SYSTEM, AND RECORDING MEDIUM

(75) Inventors: Shigeru Hosono, Tokyo (JP); Koji Kimita, Tokyo (JP); Fumiya Akasaka, Tokyo (JP); Tatsunori Hara, Tokyo (JP); Yoshiki Shimomura, Tokyo (JP); Tamio Arai, Tokyo (JP)

(73) Assignees: NEC Corporation, Tokyo (JP); Tokyo Metropolitan University, Tokyo (JP); The University of Tokyo, Tokyo (JP)

( * ) Notice: Subject to any disclaimer, the term of this patent is extended or adjusted under 35 U.S.C. 154(b) by 739 days.

(21) Appl. No.: 14/114,446

(22) PCT Filed: Apr. 19, 2012

(86) PCT No.: PCT/JP2012/061154
§ 371 (c)(1),
(2), (4) Date: Apr. 14, 2014

(87) PCT Pub. No.: WO2012/147825
PCT Pub. Date: Nov. 1, 2012

(65) Prior Publication Data
US 2014/0223410 A1 Aug. 7, 2014

(30) Foreign Application Priority Data
Apr. 28, 2011 (JP) ................................ 2011-101106

(51) Int. Cl.
*G06F 9/44* (2006.01)
*G06F 9/50* (2006.01)

(52) U.S. Cl.
CPC .............. *G06F 8/20* (2013.01); *G06F 9/5077* (2013.01)

(58) Field of Classification Search
CPC ................ G06F 8/10; G06F 8/20; G06F 8/36
(Continued)

(56) References Cited

U.S. PATENT DOCUMENTS

2005/0160411 A1* 7/2005 Sangal ...................... G06F 8/20
717/144

FOREIGN PATENT DOCUMENTS

JP  2008-140240 A   6/2008
JP     4104622 B   6/2008
(Continued)

OTHER PUBLICATIONS

Hosono et all., "A Lifetime Supporting Framework for Clud Applications", IEEE, Proceeding 3f 2010 IEEE 3rd International Conference on Cloud Computing, Jul. 5, 2010, pp. 362-369.*
(Continued)

*Primary Examiner* — Hang Pan
*Assistant Examiner* — Hui-Wen Lin
(74) *Attorney, Agent, or Firm* — Wilmer Cutler Pickering Hale and Dorr LLP

(57) ABSTRACT

Provided is an application architecture design method in which an information processing device is used, the method including the steps of: inputting information about dependency relations and design aspects, which are design items regarding modules for running functions, virtual machines for running the modules, and physical machines for running the virtual machines; and executing processing of adapting architecture properly by switching the input information about the dependency relations and the design aspects in matrices in a DSM format, and thereby rearranging allocation of the modules, allocation of the virtual machines, and allocation of the physical machines in stages in the DSM format. As a result, an excellent design solution for architecture suitable for a virtualized environment, a cloud environment deriving, or a similar environment can be derived.

16 Claims, 16 Drawing Sheets

(58) Field of Classification Search
USPC .......................................................... 717/104
See application file for complete search history.

(56) References Cited

FOREIGN PATENT DOCUMENTS

| JP | 2008140240 A | * | 6/2008 | ............... G06F 9/50 |
|---|---|---|---|---|
| JP | 4319007 B | | 8/2009 | |
| WO | WO-2005/029382 | | 3/2005 | |

OTHER PUBLICATIONS

International Search Report of PCT/JP2012/061154 mailed Jun. 19, 2012 (2 pages).
Albert Albers et al., "A Method to Define a Product Architecture Early in Product Development Using a contact and Channel Model," ICED, Aug. 2009, Stanford University, pp. 241-252.
Shigeru Hosono et al., "A Lifetime Supporting Framework for Cloud Applications" Proceeding of 2010 IEEE $3^{rd}$ International Conference on Cloud Computing, IEEE, Jul. 5, 2010, pp. 362-369.
Shigeru Hosono et al., Fast Development Platforms and Methods for Cloud Applications Proceedings of 2011 IEEE Asia-Pacific Services Computing Conference, IEEE, Dec. 15, 2011, pp. 94-101.
Written Opinion of Searching Authority dated Jun. 19, 2012, 4 pages, and Translation of Relevant Part of Written Opinion of International Searching Authority (2 pages).

* cited by examiner

|   | A | B | C | D | E | F | G | H |
|---|---|---|---|---|---|---|---|---|
| A |   | 0.6 | 0.3 |   |   |   |   | 0.4 |
| B | 0.6 |   | 0.3 |   |   |   |   | 0.4 |
| C | 0.3 | 0.3 |   |   |   |   |   |   |
| D |   |   |   |   | 0.5 | 0.5 | 0.4 | 0.2 |
| E |   |   |   | 0.5 |   | 0.5 | 0.4 | 0.2 |
| F |   |   |   | 0.5 | 0.5 |   | 0.4 | 0.2 |
| G |   |   |   | 0.4 | 0.4 | 0.4 |   |   |
| H | 0.4 | 0.4 |   | 0.2 | 0.2 | 0.2 |   |   |

FIG. 3

| DESIGN ASPECT | DETAILS |
|---|---|
| PERFORMANCE | RELEVANCE IN DATA TRANSACTION |
| PERFORMANCE | SHARING OF FILE WRITE |
| PERFORMANCE | ... |
| MAINTAINABILITY | NECESSITY/NON-NECESSITY FOR SIMULTANEOUS SHUTDOWN IN UPDATE |
| MAINTAINABILITY | WHETHER HAVING THE SAME OWNER OR DIFFERENT OWNERS |
| MAINTAINABILITY | ... |
| SECURITY | NECESSITY/NON-NECESSITY FOR DATA ISOLATION |
| SECURITY | NECESSITY/NON-NECESSITY FOR ISOLATION BETWEEN VMS |
| SECURITY | ... |
| AVAILABILITY | RELEVANCE IN SHUTDOWN RANGE |
| AVAILABILITY | NEED FOR FAULT TOLERANCE |
| AVAILABILITY | ... |
| MIGRATABILITY | RELEVANCE IN INFLUENCE OF MIDDLEWARE UPDATE |
| MIGRATABILITY | NECESSITY/NON-NECESSITY FOR MODULE HOT UPDATE |
| MIGRATABILITY | ... |

FIG. 8

BEFORE
REARRANGEMENT
(ADAPTATION)

AFTER
REARRANGEMENT
(ADAPTATION)

APPLICATION ARCHITECTURE DESIGN METHOD, APPLICATION ARCHITECTURE DESIGN SYSTEM, AND RECORDING MEDIUM

CROSS-REFERENCE TO RELATED APPLICATIONS

This application is a national stage application of International Application No. PCT/JP2012/061154 entitled "Application Architecture Design Method, Application Architecture Design Device, and Recording Medium," filed on Apr. 19, 2012, which claims the benefit of the priority of Japanese patent application No. 2011-101106, filed on Apr. 28, 2011, the disclosures of each of which are hereby incorporated by reference in their entirety.

TECHNICAL FIELD

This invention relates to a method, device and a recording medium for designing application architecture. More particularly, This invention relates to a method, device and a recording medium for designing application architecture suitable for a virtualized environment or a cloud environment.

BACKGROUND ART

The designing/developing of a Web application uses established standard architecture such as the Web 3-tier model. The Web 3-tier model is sorted into a Web screen (interface) for receiving a request of the application, a module for processing the request of the application, and a database for reading/writing the result of the processing or the like. Designing methods using this sorting are used in common designing/developing of a Web application.

The use of an application program that operates in a distributed manner on unspecific machines is becoming commonplace in virtualized environments or cloud environments. Application programs specialized for use in such environments are also being designed/developed.

Cloud computing utilizes functions of application software, functions of middleware that executes an application, and functions of infrastructure components such as an operating system, a network, and storage to build an application that provides a given function to users.

The main elemental technology for implementing cloud computing is a technology of virtualizing a server, storage, and the like. The virtualizing technology distinguishes the category of physical hardware resources (physical machines) such as a CPU and a hard disk from the category of logical hardware functions (virtual machines) such as the count of virtually allocated CPU cores and the virtually allocated storage amount.

Today's Web application design/development treats the physical and logical hardware categories described above as one category. In the developing of an application for use in a cloud environment or a similar environment, on the other hand, each distinguished part is cut out as a design interface for creating an application configuration. Consequently, the number of design interfaces tends to be significantly larger in application development that takes the virtualizing technology into account than in the designing of a Web application that does not distinguish different aspects of hardware.

CITATION LIST

Patent Literature

Patent Document 1: Japanese Patent No. 4104622
Patent Document 2: Japanese Patent No. 4319007

Non Patent Literature

Non-Patent Document 1: Albert Albers, Korkiat Sedchaicharn, Christian Sauter, and Wolfgang Burger, "A Method to Define a Product Architecture Early in Product Development Using a Contact and Channel Model", ICED '09 24-27 Aug. 2009, STANFORD UNIVERISTY, P241-P252

DISCLOSURE OF THE INVENTION

Problem to be Solved by the Invention

In cloud computing environments and similar environments, which are becoming widespread, an application configuration determining method employing existing standard architecture that has been established does not have room for sufficient consideration on performance, maintenance, and the like, and makes it difficult to design an optimum application.

The existing application designing involves breaking a plurality of design interfaces into modules as a basic design guide for enhancing performance and maintainability.

In virtualized/cloud environments, on the other hand, hardware and software are run independently of each other, and a desired application architecture design therefore takes the two into consideration simultaneously.

Conventional designing methods, however, have difficulties with breaking applications, which include design interfaces, into modules appropriately.

The term application architecture herein refers to software and hardware configurations in which the efficiency, security, and the like of data addition/update or similar processing are taken into consideration. Architecture designing means defining those configurations, designing the place to store data that constitutes the application, and designing the configurations and execution places of modules for processing data.

An application program operating in a cloud environment (a cloud application program) uses a virtualized function by calling the virtualized function as the need arises from among servers and pieces of storage disposed in a data center that provides the cloud environment. Most cloud applications (services) are distributed systems for reasons including the fact that modules constituting the application are distributed among a plurality of virtual machines, and that remote data store is used. Cloud application programs therefore need to adapt to distributed systems.

With such application architecture design methods, however, sufficient consideration cannot be paid at the designing/developing stage on such matters as which physical hardware resources are used to run a module that constitutes a virtualized function to be called when necessary. An example of a cause of designing difficulties is given. In a cloud service, a plurality of functions or a plurality of applications share the same physical hardware resources, which makes it difficult to design function performance that is expected in order to provide the service.

The inventors of this invention have applied their own ideas to the simplification of such application architecture design methods under the design concepts of axiomatic design and Design for X (DfX).

Axiomatic design defines four domains: customer attribute, functional requirement, design parameter, and process variable. The design process thereof progresses from customer attribute (CA), to functional requirement (FR), to design parameter (DP), and then to process variable (PV). DfX is a designing method that handles a plurality of design aspects such as performance and security simultaneously.

FIG. 16 is a model that integrates these concepts into one. This model is introduced into a method of designing an application run in a cloud environment. Specifically, the process of designing the application run in a cloud environment is simplified into three stages: FR→DP1, DP1→DP2, and DP2→PV.

In axiomatic designing described above, the design process can be expressed in a format by using a two-dimensional matrix and writing the relation between elements of CA and elements of FR, the relation between elements of FR and elements of DP, and the relation between elements of DP and elements of PV as in FIG. 16.

One of methods of simplifying and visualizing relations between components in a complicate system with the use of a matrix to assist in making an appropriate design decision is Dependency (Design) Structure Matrix (DSM) for facilitating system building, which is being increasingly complicated.

DSM is capable of dividing component functions with a product as a target, dividing teams with a human system organization as a target, dividing activities based on the flow of information, and dividing modules based on the parameter relations of design values. Examples of literatures related to methods that use DSM are given below.

Non Patent Literature 1 discloses dividing component functions with a product as a target. This method uses DSM to express a dependency relation between functions constituting the product, and derives an optimum method of dividing functions by switching cell values of DSM with one another. However, the method described in this literature is limited to product functions. It is therefore difficult to use this method in an evaluation of architecture designing through a design process.

Patent Literature 1 discloses a method that utilizes DSM to eliminate wastefulness in a product development process. In product designing in general, product development progresses in stages from functional requirement to function design, and then to the designing of parameters of the respective functions. This method, although having a product development process as its object, does not include as a target the design information described above which is handled at one point in a product development process, and therefore has difficulties in optimizing design at a particular point in the process. In addition, Quality Function Design (QFD) and a DSM matrix that are disclosed in this method are characterized by weighting different row/column items differently, but present difficulties in evaluating the relation between two items from other perspectives than the function dependency relation.

Patent Literature 2 discloses a method that utilizes DSM to optimize activities being developed for the purpose of cutting the development period short. The object of this method is a development process as in Patent Literature 1. However, design information handled at one point in the process is not included as a target of this method, and it is therefore difficult to use this method in the optimization of architecture designing at a particular point in the process.

It is necessary in designing/developing an application targeted for a virtualized/cloud environment to build the logical configuration and physical configuration of the application in stages. However, the designing of application architecture that involves virtualization cannot be optimized by applying the technologies written in the cited literatures. In addition, none of the literatures mentions utilizing DSM in the designing of application architecture that uses a virtualizing technology, and how DSM is utilized in that case.

This invention provides a method of deriving an excellent design solution for application architecture in application designing in a virtualized environment or a cloud environment by following the design process described above which is simplified into three stages.

This invention provides a method of deriving modules that constitute an application program with various design aspects such as performance, maintainability, security, availability, and migratability taken into consideration.

This invention also provides a method of deriving a configuration (architecture) for disposing these modules in an execution environment favorably.

This invention further provides a device and program for deriving an application architecture design solution in application designing in a virtualized environment or a cloud environment.

Means to Solve the Problem

According to this invention, there is provided an application architecture design system, including: an entering unit for inputting information about dependency relations and design aspects, which are design items regarding modules for running functions that form an application program, virtual machines for running the modules, and physical machines for running the virtual machines; and a design matrix optimizing unit to execute processing of adapting architecture properly by allowing switching of the input information about the dependency relations and the design aspects in matrices in a DSM format, and thereby rearranging allocation of the modules, allocation of the virtual machines, and allocation of the physical machines in stages in the DSM format, and to output a result.

According to this invention, there is also provided an application architecture design method, including the steps of: inputting information about dependency relations and design aspects, which are design items regarding modules for running functions that form an application program, virtual machines for running the modules, and physical machines for running the virtual machines; and executing processing of adapting architecture properly by switching the input information about the dependency relations and the design aspects in matrices in a DSM format, and thereby rearranging allocation of the modules, allocation of the virtual machines, and allocation of the physical machines in stages in the DSM format, to thereby a design solution for architecture.

Effect of the Invention

According to this invention, it is possible to provide the method of deriving the excellent design solution for application architecture in application architecture designing in a virtualized environment or a cloud environment.

Further, according to this invention, it is possible to provide the method of deriving the modules that constitute the application program with various design aspects such as performance, maintainability, security, availability, and migratability taken into consideration. Specifically, determining how to break the software functions into the modules at the designing/developing stage is facilitated.

Further, according to this invention, it is possible to provide the method of deriving the configuration (architecture) for disposing these modules in an execution environment favorably. Specifically, determining the logical/physical locations of the application modules at the designing/developing stage is facilitated.

Further, according to this invention, it is possible to provide the device for deriving the application architecture design solution in application designing in a virtualized environment or a cloud environment.

BRIEF DESCRIPTION OF THE DRAWING

FIG. 3 is an explanatory diagram exemplifying the configuration of a design matrix.

FIG. 8 is an explanatory diagram exemplifying a list of the design aspect information.

BEST MODE FOR EMBODYING THE INVENTION

An embodiment of this invention is described with reference to the drawings.

In this embodiment, the process of designing the architecture of a cloud application is divided into three phases and design targets (module granularity, allocation, distribution, arrangement, and the like) in the respective phases are clarified. The three phases resulting from the division are a function module design phase, a module arrangement design phase, and a resource allocation design phase.

The function module design phase, which is the first phase, involves determining the association between functions constituting the application and modules constituting the application program, and determining the granularity of each module.

The module arrangement design phase, which is the second phase, involves determining the association between the modules described above and virtual machines (network resources: logical resources) where the respective modules are arranged.

The resource distribution design phase, which is the third phase, involves determining the association between the virtual machines described above and physical machines (physical resources) where the respective virtual machines are placed.

An application architecture design method of this invention executes the designing of application architecture along these three phases. This invention also configures a designing device and a program so that the designing device and the program operate along these phases.

An application architecture design device 100 which executes the application architecture design method is described below in order to describe this invention.

Figure 1:
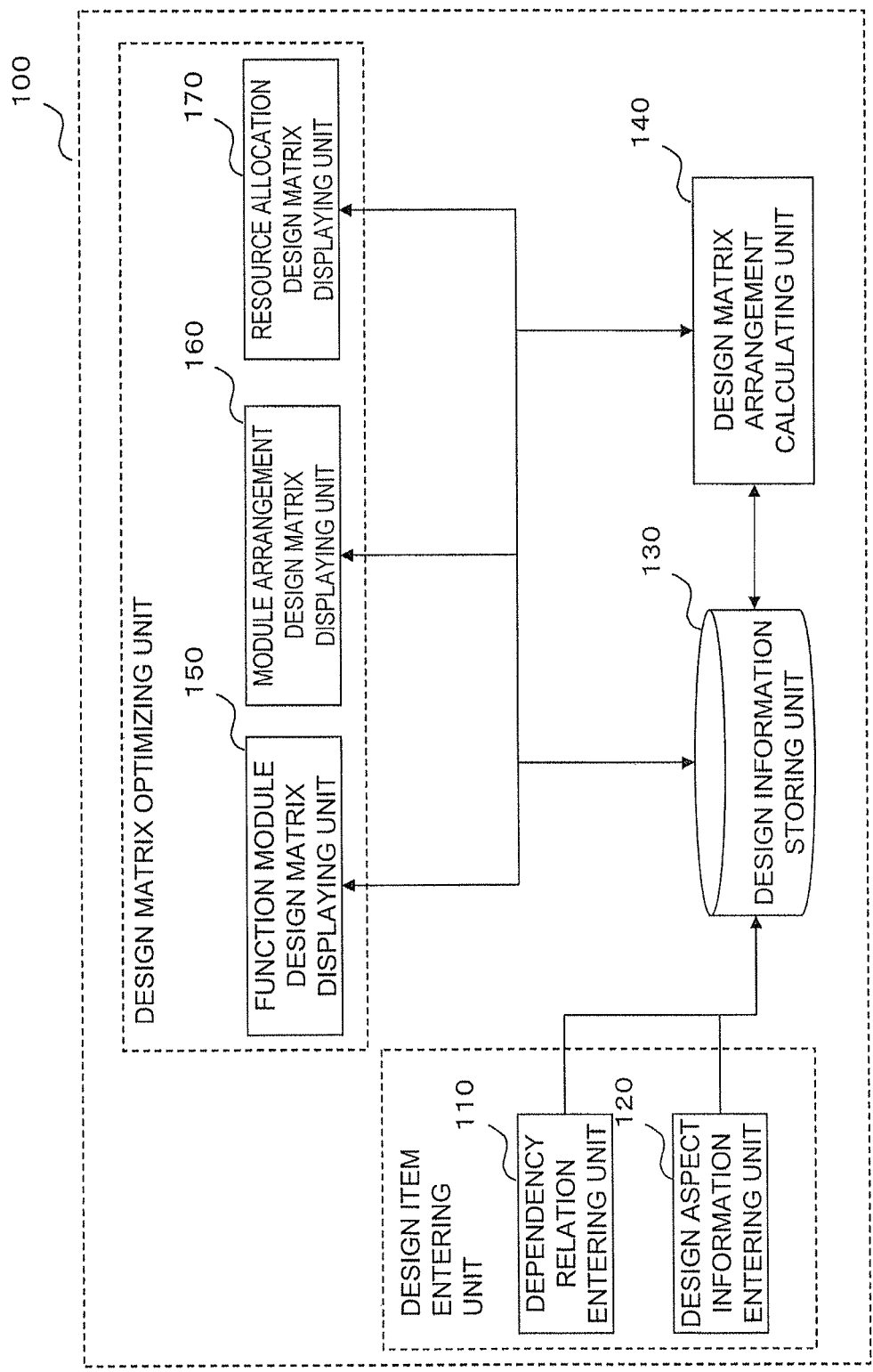
FIG. 1 is a block diagram illustrating the configuration of an application architecture design device according to an embodiment of this invention.

FIG. 1 is a block diagram illustrating the configuration of the application architecture design device 100.

The application architecture design device 100 of FIG. 1 includes a dependency relation entering unit 110, a design aspect information entering unit 120, a design information storing unit 130, a design matrix arrangement calculating unit 140, a function module design matrix displaying unit 150, a module arrangement design matrix displaying unit 160, and a resource allocation design matrix displaying unit 170. In addition to these components, the application architecture design device 100 includes other common components such as an input unit.

The dependency relation entering unit 110 and the design aspect information entering unit 120 operate as a design item entering unit. The design item entering unit is used to input information about a dependency relation and a design aspect which are design items regarding modules, virtual machines, and physical machines that form the application program.

The function module design matrix displaying unit 150, the module arrangement design matrix displaying unit 160, and the resource allocation design matrix displaying unit 170 operate as a design matrix optimizing unit. The design matrix optimizing unit displays dependency relations and design aspects on their respective layer levels as DSM format matrices, and also allows one to switch rows/columns of the displayed matrix with one another. Through this switching, the design matrix optimizing unit executes processing of changing the architecture design in a manner that corresponds to how the matrix has been manipulated.

Specifically, selecting a suitable matrix shape pattern (module granularity or the like) for each with the use of the design matrix optimizing unit accomplishes distribution/arrangement in which upper layer parts for modules, upper layer parts for virtual machines, and upper layer for physical machines are allocated appropriately. The architecture is optimized overall by repeating this distribution/arrangement.

The design matrix optimizing unit executes the changing processing (optimizing processing) in the order of the three phases (the function module design phase, the module arrangement design phase, and the resource allocation design phase). At this point, the output result of each phase is used as input information in the next phase. This accomplishes unitary and efficient architecture designing for the overall architecture.

Information input to the dependency relation entering unit 110 includes information that indicates the relation between two to be considered. The included information is, for example, information indicating the relation between two that have a direct function calling relation, such as a source from which a method is called and a destination to which the method is called, or information indicating the relation between two that have a direct physical relation, such as a module that includes a plurality of functions and a place where the module is located.

Information input to the design aspect entering unit 120 includes the following information:

Performance (data transaction relevancy, sharing of file write, etc.)

Maintainability (necessity/non-necessity for concurrent shutdown at the time of update, having different owners or the same owner, etc.)

Security (necessity/non-necessity for data isolation, necessity/non-necessity for isolation between VMs, etc.)

Availability (relevancy in shutdown range, necessity for fault tolerance, etc.)

Migratability (relevance in influence of middleware update, necessity/non-necessity for module hot update, etc.)

The design information storing unit 130 receives dependency relation information and design aspect information which are inputs to store the inputs for keep, and stores for keep design matrix information which is generated after rearrangement (optimization) is finished for each.

The design matrix arrangement calculating unit 140 uses various algorithms to execute automatic changing (rearranging) processing for each design matrix received so that the row/column arrangement of the design matrix approaches a given pattern, and returns the result of the processing.

The operation of the application architecture design device 100 is described next with reference to FIGS. 2, 3, 4, 5, and 6.

[First Phase]

The function module design phase for determining the module configuration of the application program that is used to provide the application is executed as the first phase.

Figure 4:
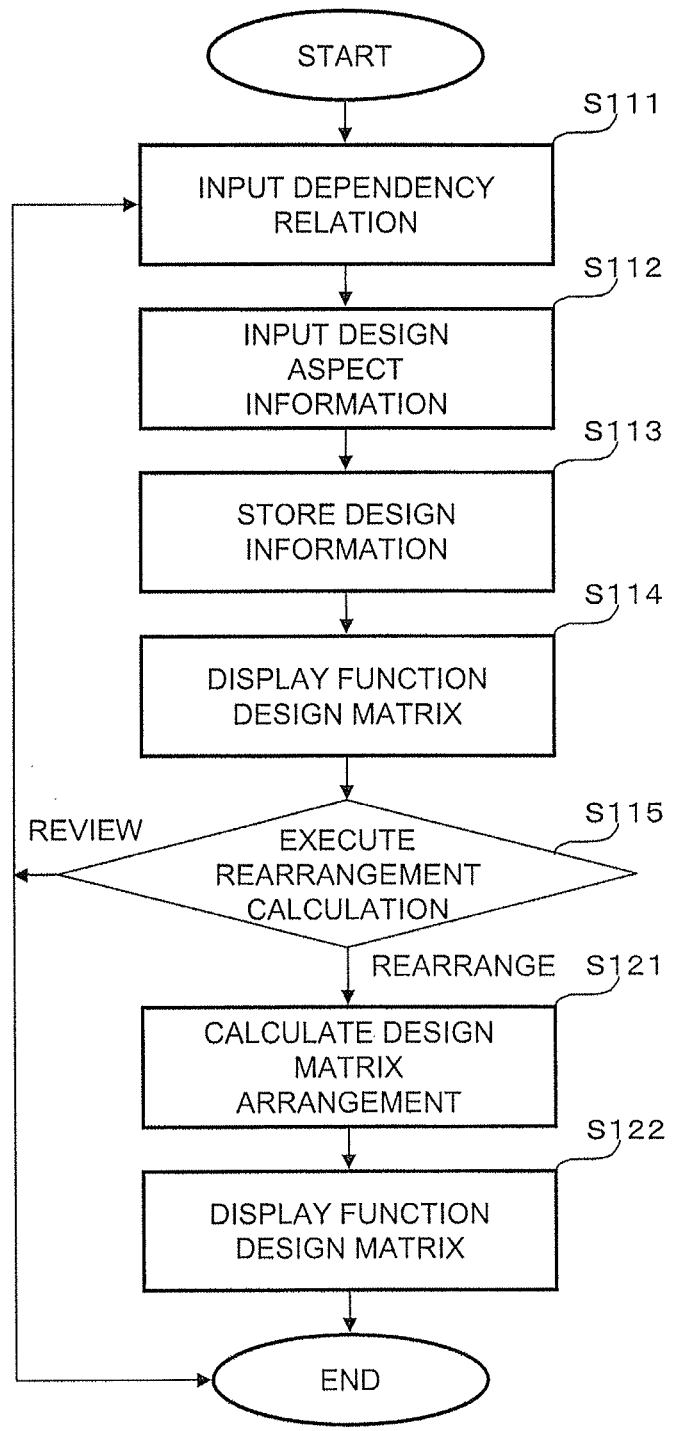
FIG. 4 is a flow chart illustrating processing of a function design phase.

First, functions constituting the application and calling relations between the functions are input as dependency relations to the dependency relation entering unit 110 (S111 of FIG. 4).

Figure 2:
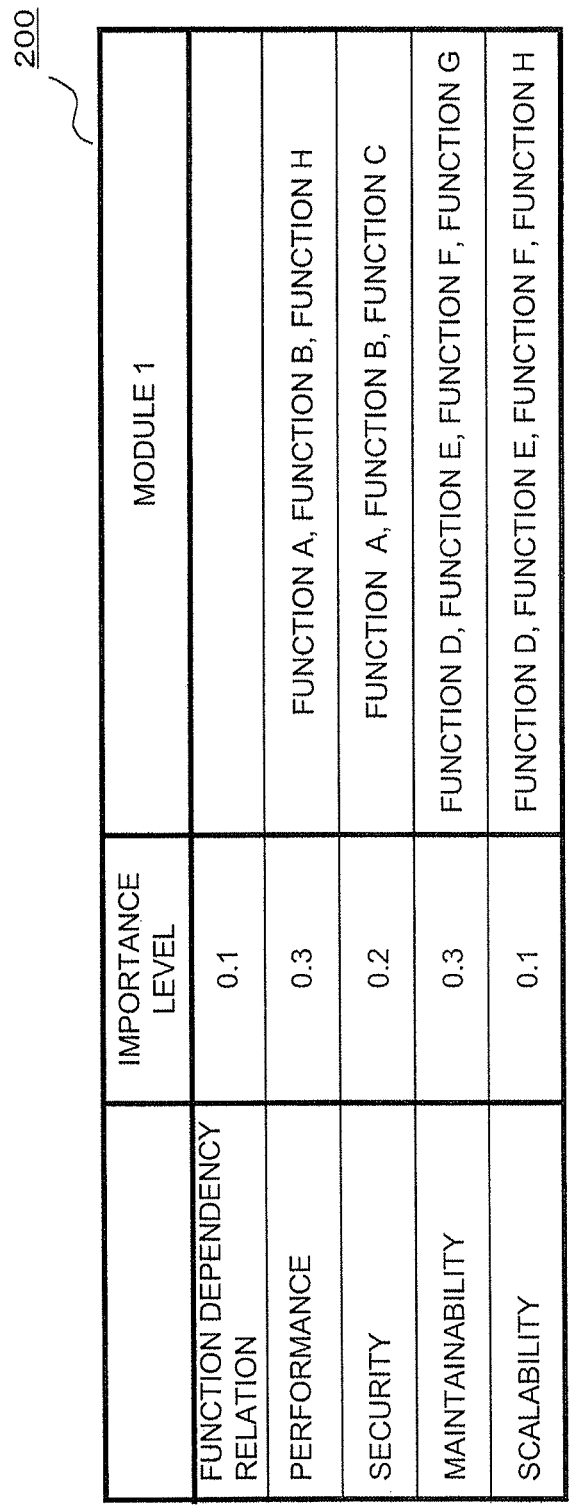
FIG. 2 is an explanatory diagram exemplifying the configuration of design aspect information used in the embodiment of this invention.

Next, in the case where there is relevance between particular functions as application logic such as a performance requirement regarding data transaction, information thereof is input to the design aspect information entering unit 120 as design aspect information 200 (S112, see FIG. 2). The input design aspect information can be classified by various design aspects such as "function dependency relation", "performance", "security", "maintainability", "scalability", "availability", and "migratability" as exemplified in FIG. 2, and a level of importance can be assigned to each aspect.

The example of FIG. 2 shows that, of functions allocated to Module 1, Function A, Function B, and Function H are related to one another with respect to "performance", whereas Function A, Function B, and Function C are related to one another with respect to "security". The same applies to "maintainability" and "scalability". These design aspects are input based on the knowledge of an enterer who enters design aspect information (the architect).

The enterer suitably assigns a level of importance to each performance aspect. In the case of a design aspect about "performance" of FIG. 2, the level of importance of "function dependency relation" is added into consideration for the relation between Function A and Function B, the relation between Function B and Function H, and the relation between Function A and Function H. The level of importance assigned to a dependency relation between functions is a value assigned by adding, for example, a direct calling relation between functions into consideration.

In the example of FIG. 2, the levels of importance assigned to the respective design aspects are 0.1 for "function dependency relation", 0.3 for "performance", 0.2 for "security", 0.3 for "maintainability", and 0.1 for "scalability".

The architect desirably enters importance level values so that the sum of the levels of importance assigned to the respective requirements is 1.0.

As illustrated in the figure, a value to be assigned to relevance between particular functions may be added separately from a value to be assigned to the whole (e.g., 0.1 for function dependency relation). The application architecture design device sets the assigned values in cells of a design matrix as illustrated in FIG. 3.

The design information storing unit 130 receives the information input in Sill 1 and S112, and stores the information as design matrix information (S113).

The function module design matrix displaying unit 150 uses the design matrix information stored in the design information storing unit 130 to display a DSM format matrix (a function module design matrix) (S114, see FIG. 3). Through this processing, an importance level value is assigned to each cell of the function module design matrix and the association between a function and a module is displayed as illustrated in FIG. 3. The level of importance here is calculated based on the level of importance of FIG. 2 which is assigned as the design aspect information, while adding the level of dependency between each pair of modules into consideration.

The sufficiency of information input in S111 and S112 is checked after this matrix visualization based on the DSM method, and the application architecture design device 100 returns to Sill in the case where reviewing is necessary. In the case where reviewing is unnecessary and functions are divided appropriately, the specifics thereof are output as design matrix information to the design information storing unit 130, and then the displaying is ended. In the case where rearrangement is executed based on the visualized matrix, the application architecture design device 100 proceeds to S121 (S115). The sufficiency can be determined by referring to the DSM matrix, from the locations of modules relative to a diagonal line of the alignment, the sum of values included in the respective modules, or the like. By checking the sufficiency, the integration of modules with one another, the importance of a module, or the granularity of a module, for example, can be determined.

To calculate rearrangement of the function module design matrix, the function module design matrix displaying unit 150 calculates design matrix information by executing processing of switching (rearranging) matrix rows and columns upon reception of an input of a rearrangement instruction, while maintaining the interrelation between pieces of information displayed. The function module design matrix displaying unit 150 uses the calculated design matrix information to change the matrix so that the rearrangement is reflected, and executes processing of registering in the design information storing unit 130 (S121).

Adapting the association between a function and a module properly (making decisions such as determining the granularity of each module) by changing the arrangement of rows/columns may be conducted through manual manipulation of the matrix by a user himself/herself. At this point, the architecture is adapted properly by advancing the breaking of the design matrix into modules (blocks). In a recommended strategy for accomplishing optimum module dividing by DSM, modules are gathered to an oblique line of the arrangement and the sum of values included in the respective modules approaches a maximum value.

In the case where rows/columns are large in number, on the other hand, a proper solution is derived more effectively with the use of the design matrix arrangement calculating unit 140 which automatically calculates a proper solution for design/development based on the row/column rearrangement of each design matrix. A genetic algorithm can be used for the automatic calculation of the proper solution. Other algorithms may also be used. With this automation, a model diagram (blueprint) of architecture favored for the input design matrix information is obtained. Also in the automatic calculation of the proper solution, a program that executes an adaptation algorithm employed derives, for example, a pattern (the shape and density of the matrix) that arranges modules obliquely in the alignment and maximizes the sum of values included in the respective modules, as is the case for obtaining the proper solution manually. The derived pattern is not limited to one type and a plurality of types of patterns may be derived.

The function module design matrix displaying unit 150 uses the design matrix information obtained through the rearrangement calculation to display a post-rearrangement calculation function module design matrix (S122). When displaying the post-rearrangement calculation matrix, the function module design matrix displaying unit 150 may display the pre-rearrangement function module design matrix and the post-rearrangement function module design matrix so that the two can be compared.

Through the first phase described above, the module configuration (the assigned function, granularity, and the like) of the application program is determined. Specifically, by referring to the function module design matrix, design aspects such as performance, maintainability, security, availability, migratability, and the dependency relation between functions can be identified, and an excellent module configuration that takes these design aspects into consideration can be derived through rearrangement of the matrix.

As a result, determining how to break software functions into modules at the designing/developing stage is facilitated. The development of individual modules is executed after overall adaptation is executed in the following phase.

[Second Phase]

The module arrangement design phase for determining the logical arrangement of the modules in relation to the application module configuration determined in the manner described above is executed next as the second phase.

Figure 5:
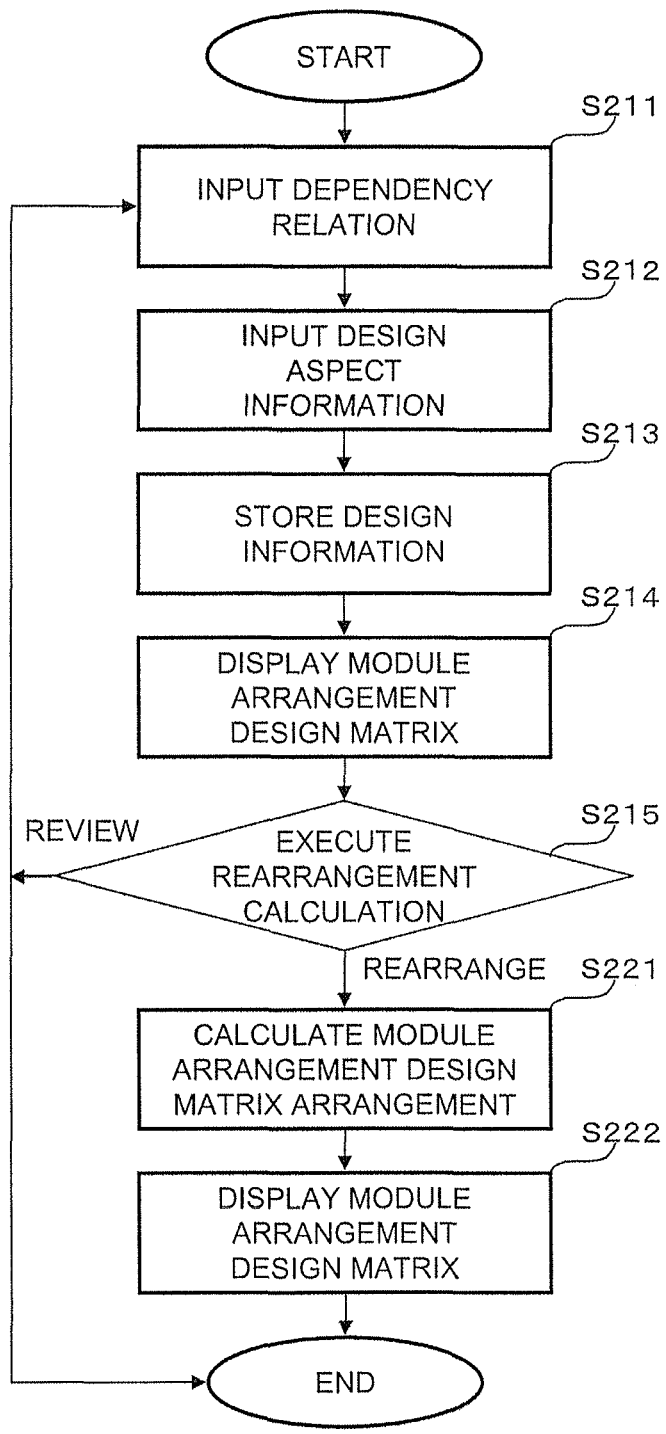
FIG. 5 is a flow chart illustrating processing of a module arrangement design phase.

First, modules constituting the application and calling relations between the modules are input as dependency relations to the dependency relation entering unit 110 (S211 of FIG. 5).

Next, in the case where there is relevance between particular modules with respect to availability, maintainability, migratability, security, or other requirements (design aspects), these are input as the design aspect information 200 to the design aspect information entering unit 120 (S212, see FIG. 2).

The design information storing unit 130 receives the information input in S211 and S212, and stores the information as design matrix information (S213).

The module arrangement design matrix displaying unit 160 uses the design matrix information stored in the design information storing unit 130 to display a DSM format matrix (a module arrangement design matrix) (S214).

The sufficiency of information input in S211 and S212 is checked after this matrix visualization based on the DSM method, and the application architecture design device 100 returns to S211 in the case where reviewing is necessary. In the case where reviewing is unnecessary and module arrangement is made appropriately, the specifics thereof are output as design matrix information to the design information storing unit 130, and then the displaying is ended. In the case where rearrangement is executed based on the visualized matrix, the application architecture design device 100 proceeds to S221 (S215). The sufficiency determination in this phase may be made by using the same reference (arrangement, sum, and the like) that is used for the determination in the preceding phase (the function module design phase).

To calculate rearrangement of the module arrangement design matrix, the module arrangement design matrix displaying unit 160 calculates design matrix information by executing processing of switching (rearranging) matrix rows and columns upon reception of an input of a rearrangement instruction, while maintaining the interrelation between pieces of information displayed. The module arrangement design matrix displaying unit 160 uses the calculated design matrix information to change the matrix so that the rearrangement is reflected, and executes processing of registering in the design information storing unit 130 (S221).

Adapting the association between a module and a logical resource properly (making decisions such as determining the arrangement of modules among logical resources and the density of the arrangement) by changing the arrangement of rows/columns may be conducted by advancing the module arrangement (breaking of the design matrix into blocks) through manual manipulation of the design matrix by a user himself/herself. At this point, the architecture is adapted properly by advancing the breaking of the design matrix into modules (blocks). In a recommended strategy for accomplishing optimum module arrangement by DSM, modules are arranged obliquely to the line of the arrangement and the sum of values included in the respective modules approaches a maximum value.

The proper solution may be derived with the use of the design matrix arrangement calculating unit 140. The proper solution is calculated automatically in the same manner as in the function module design phase described above. With this automation, a model diagram (blueprint) of architecture favored for the input design matrix information is obtained. A plurality of types of matrix patterns may be derived. The derived matrix pattern may be one that uniformizes the barycenter, on the matrix, of the sum of the individual modules derived in the preceding phase. Uniformizing the barycenters of modules in this manner averages the distribution of individual modules among virtual machines based on the levels of importance input as the design aspect information. This averaging is expected to even out various types of processing throughout a cloud environment.

The module arrangement design matrix displaying unit 160 uses the design matrix information obtained through the rearrangement calculation to display a post-rearrangement calculation module arrangement design matrix (S222). When displaying the post-rearrangement calculation matrix, the module arrangement design matrix displaying unit 160 may display the pre-rearrangement module arrangement design matrix and the post-rearrangement module arrangement design matrix so that the two can be compared. The module arrangement design matrix displaying unit 160 may display the function module design matrix along with the module arrangement design matrix.

The second phase described above determines the arrangement of the individual modules derived in the preceding phase in logical devices that are execution environments of the modules. Specifically, determining the logical locations of the application modules at the designing/developing stage is facilitated by referring to the function module design matrix.

[Third Phase]

The resource allocation design phase for determining the physical arrangement of the logical resources in which modules have been arranged in relation to the logical devices of the modules determined in the manner described above is executed next as the third phase.

Figure 6:
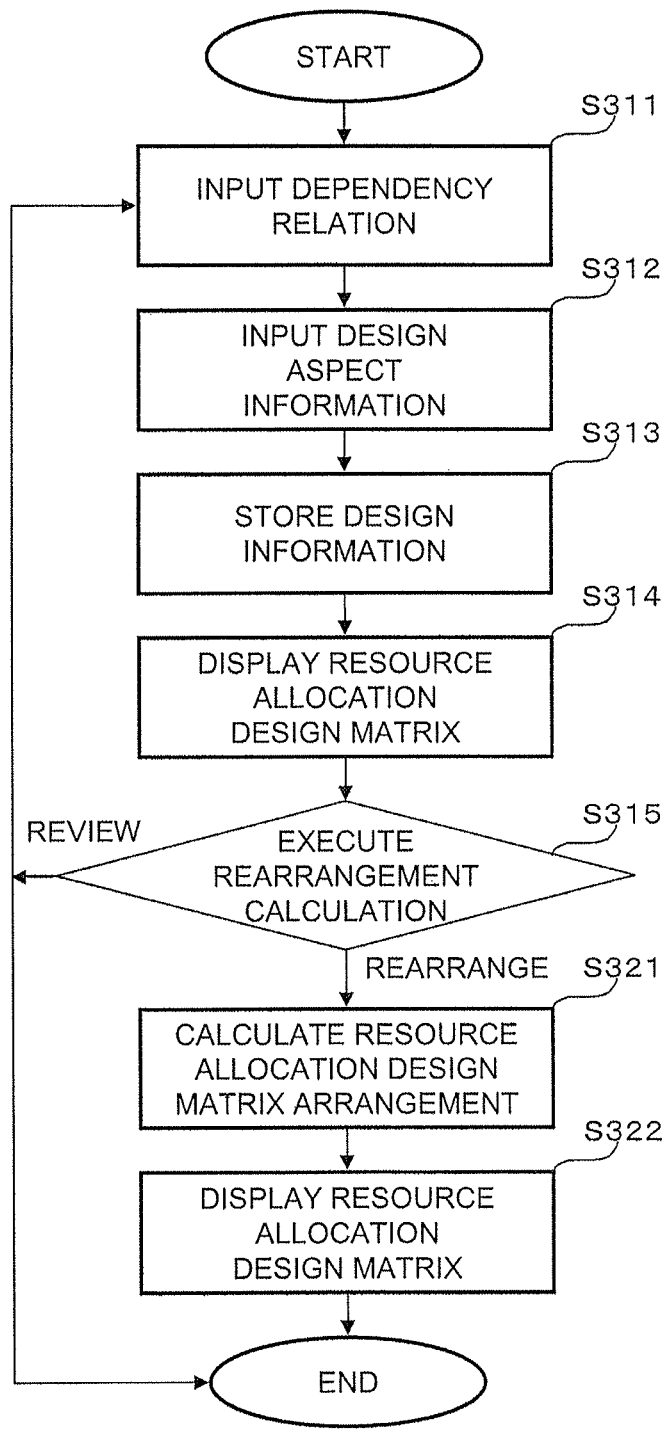
FIG. 6 is a flow chart illustrating processing of a resource distribution design phase.

First, calling relations between applications are input as dependency relations to the dependency relation entering unit 110 (S311 of FIG. 6).

Next, in the case where particular modules (logical resources where the modules are mounted) are to have relevance with each other based on a performance requirement or the like, these are input as the design aspect information 200 to the design aspect information entering unit 120 (S312).

The design information storing unit 130 receives the information input in S311 and S312, and stores the information as design matrix information (S313).

The resource allocation design matrix displaying unit 170 uses the design matrix information stored in the design information storing unit 130 to display a DSM format matrix (a resource allocation design matrix) (S314).

The sufficiency of information input in S311 and S312 is checked after this matrix visualization based on the DSM method, and the application architecture design device 100 returns to S311 in the case where reviewing is necessary. In the case where reviewing is unnecessary and module arrangement is made appropriately, the specifics thereof are output as design matrix information to the design information storing unit 130, and then the displaying is ended. In the case where rearrangement is executed based on the visualized matrix, the application architecture design device 100 proceeds to S321 (S315). Note that, the sufficiency may be determined in the same manner as in the preceding phase.

To calculate rearrangement of the resource allocation design matrix, the resource allocation design matrix displaying unit 170 calculates design matrix information by executing processing of switching (rearranging) matrix rows and columns upon reception of an input of a rearrangement instruction, while maintaining the interrelation between pieces of information displayed. The resource allocation design matrix displaying unit 170 uses the calculated design matrix information to change the matrix so that the rearrangement is reflected, and executes processing of registering in the design information storing unit 130 (S321).

As in the preceding phase, adapting the association between logical resources and physical resources properly (making decisions such as determining the arrangement of virtual machines among physical resources and the density of the arrangement) by changing the arrangement of rows/columns may be conducted by the advancing the breaking of the design matrix into modules through manual manipulation of the design matrix by the user himself/herself, or by deriving a proper solution with the use of the design matrix arrangement calculating unit 140. The architecture is thus adapted properly by advancing the breaking of the design matrix into modules (blocks).

The proper solution is calculated automatically in the same manner as in the function module design phase and the module arrangement design phase described above. With this automation, a model diagram (blueprint) of architecture favored for the input design matrix information is obtained. A plurality of types of matrix patterns may be derived. The derived matrix pattern may be one that uniformizes the barycenter, on the matrix, of the sum of the individual logical resources derived in the module arrangement phase. By uniformizing the barycenters of logical resources in this manner, even via the logical resources, it can be expected to average the distribution of individual modules among physical machines based on the levels of importance input as the design aspect information and to even out the processing.

The resource allocation design matrix displaying unit 170 uses the design matrix information obtained through the rearrangement calculation to display a post-rearrangement calculation resource allocation design matrix (S322). When displaying the post-rearrangement calculation matrix, the resource allocation design matrix displaying unit 170 may display the pre-rearrangement resource allocation design matrix and the post-rearrangement resource allocation design matrix so that the two can be compared. The resource allocation design matrix displaying unit 170 may display the function module design matrix and the module arrangement design matrix along with the resource allocation design matrix.

Through the third phase described above, favored allocation locations are determined for the individual logical resources derived in the preceding phase in physical devices (physical resources) that are execution environments of the logical resources.

The application architecture design device 100 is thus capable of deriving an excellent design solution for application architecture in a virtualized environment or a cloud environment.

The embodiment is described below through a concrete example with reference to FIGS. 7, 8, 9, 10, 11, 12, and 13.

Figure 7:
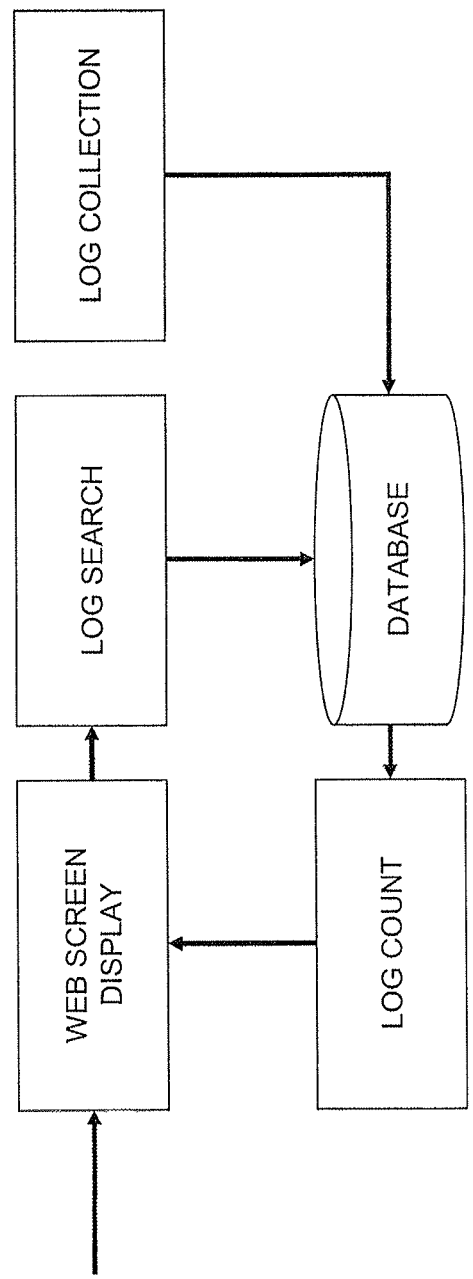
FIG. 7 is a block diagram illustrating as an example the configuration of an application program built for use in a cloud computing environment.

FIG. 7 illustrates as an example the configuration of an application program to be built in a cloud computing environment. This cloud application program collects logging information of server machines placed in a network at regular intervals, and stores the information in a database.

The cloud application program also constructs a Web screen (interface) as a user interface. When a request for a keyword search is received from a user via the network, the cloud application program reads stored data out of the database, extracts logs that contain the keyword, and counts the number of the extracted logs to present on a Web screen.

As functions that this application possesses, a log collecting function, a scheduling function, a log writing function, and a data storing function are listed first. The application also has a request entering function, a request analyzing function, a data cache function, a data search function, a search result counting function, and a count result outputting function.

The architect first enters the calling relations between functions described above to the application architecture design device 100 from the dependency relation entering unit 110.

Here, the design aspect information entering unit 120 selects aspects regarding performance and security from a list showing design aspects, such as one illustrated in FIG. 8, to enter design aspect information.

The architect next enters, as an item of the design aspect information, to the design aspect information entering unit 120, requirements of the performance aspect which are executing the log collecting function and the log writing function, desirably in succession, and executing the log writing function and the data storing function unitarily in succession. Similarly, the architect enters other requirements of the performance aspect and items of other aspects. The input information is not limited to manual input by the architect, but may be cited from, for example, past design aspect information accumulated in a database.

When setting this settings, the architect desirably enters a level of importance for each requirement so that the sum of the importance level values is 1.0. An example of setting the levels of importance is shown in FIG. 2. In the setting example of FIG. 2, the sum is adjusted to 1.0 by setting 0.1 for function dependency relation, 0.3 for performance, 0.2 for security, 0.3 for maintainability, and 0.1 for scalability.

The design information storing unit 130 receives the input dependency relation information and design aspect information, and stores as design matrix information. For a pair of functions specified in the design aspect information, the design information storing unit 130 adds the importance level value of a design aspect of the functions.

Receiving the inputs of the information, the application architecture design device 100 runs the function module design matrix displaying unit 150 automatically or upon instruction from the architect, to read design matrix information registered in the design information storing unit 130 and to display, for presentation to the architect, a function-module design matrix in a DSM format which reflects the association relation between functions allocated to the respective modules and the modules to which the functions are allocated.

The function module design matrix is adapted properly at this point to calculate modules reflecting function division that takes performance into consideration.

In the case of performing the calculation manually, the application architecture design device 100 receives the manipulation of the design matrix by the architect, recalculates (executes processing of reconstructing) the design matrix (design matrix information), and displays the resultant function module design matrix in a suitable manner.

In the case of performing the calculation automatically, the application architecture design device 100 receives an input of rearrangement from the design matrix arrangement calculating unit 140, automatically recalculates (executes processing of reconstructing) the design matrix (design matrix information), and displays one or more resultant function module design matrices.

The architect visually checks the design matrix output to the function module design matrix displaying unit 150 as the need arises, to thereby visually check whether or not reviewing is necessary and whether or not the design is appropriate. The pre-rearrangement design matrix and the post-rearrangement design matrix may be displayed so that the two can be compared. The association with other matrices or the density and barycenter of each module may also be displayed as visual effects.

Figure 9:
FIG. 9 is an explanatory diagram illustrating an example of matrix rearrangement processing.

FIG. 9 illustrates an example of matrix rearrangement. The architect or the design matrix arrangement calculating unit 140 moves rows and columns respectively for rearrangement so that many cells whose values are aligned along a diagonal line (cells painted black) and in the lower left direction form large modules (aggregations of cells: blocks).

The size of a module in the DSM notation serves as the unit of module granularity of the program. In FIG. 9, each cell is expressed by one of binary values, 0 and 1. In the case where each cell is weighted by a value between 0 and 1 as illustrated in FIG. 3, instead of being expressed by one of binary values 0 and 1, an appropriate combination is one that produces a large sum values in the block.

The following division result, for example, is obtained as the module configuration after the rearrangement in the first phase:

(1) Log collecting function, log writing function
(2) Scheduling function
(3) Data storing function, data search function
(4) Request entering function, count result outputting function
(5) Request analyzing function, data cache function
*(1) to (5) represent individual modules.

The modules given above are next arranged among virtual machines in the second phase.

Here, aspects regarding maintainability, security, availability, migratability, and the like are input to the design aspect information entering unit 120 as follows:

From the aspect of maintainability, (1) the log collecting function and the log writing function and (2) the scheduling function are desirably managed on the same virtual machine. Similarly, (3) the data storing function and the data search function and (4) the request entering function and the count result outputting function are desirably managed on the same virtual machine from the aspect of maintainability. These pieces of information are input as requirements of maintainability, and other requirements (regarding scalability, maintainability, and the like) are input as well. The aspects may be input at a suitable point, for example, at the start of the phase or during the preceding phase, or may be input additionally.

Receiving the inputs of the information, the application architecture design device 100 runs the module arrangement design matrix displaying unit 160 to read design matrix information registered in the design information storing unit 130 and to display, for presentation to the architect, a design matrix in a DSM format that shows, for each module, a virtual machine where the module operates individually.

The module arrangement design matrix is adapted properly at this point, and the arrangement of modules among the virtual machines that reflects the requirements is calculated.

In the case of performing the calculation manually, the application architecture design device 100 receives the manipulation of the design matrix by the architect, recalculates the design matrix, and displays the resultant module arrangement design matrix in a suitable manner.

In the case of performing the calculation automatically, the application architecture design device 100 receives an input of rearrangement from the design matrix arrangement calculating unit 140, automatically recalculates the design matrix, and displays one or more resultant module arrangement design matrices.

The architect visually checks the pre-rearrangement design matrix and post-rearrangement design matrix output to the module arrangement design matrix displaying unit 160 as the need arises, to thereby visually check whether or not reviewing is necessary and whether or not the design is appropriate.

Figure 10:
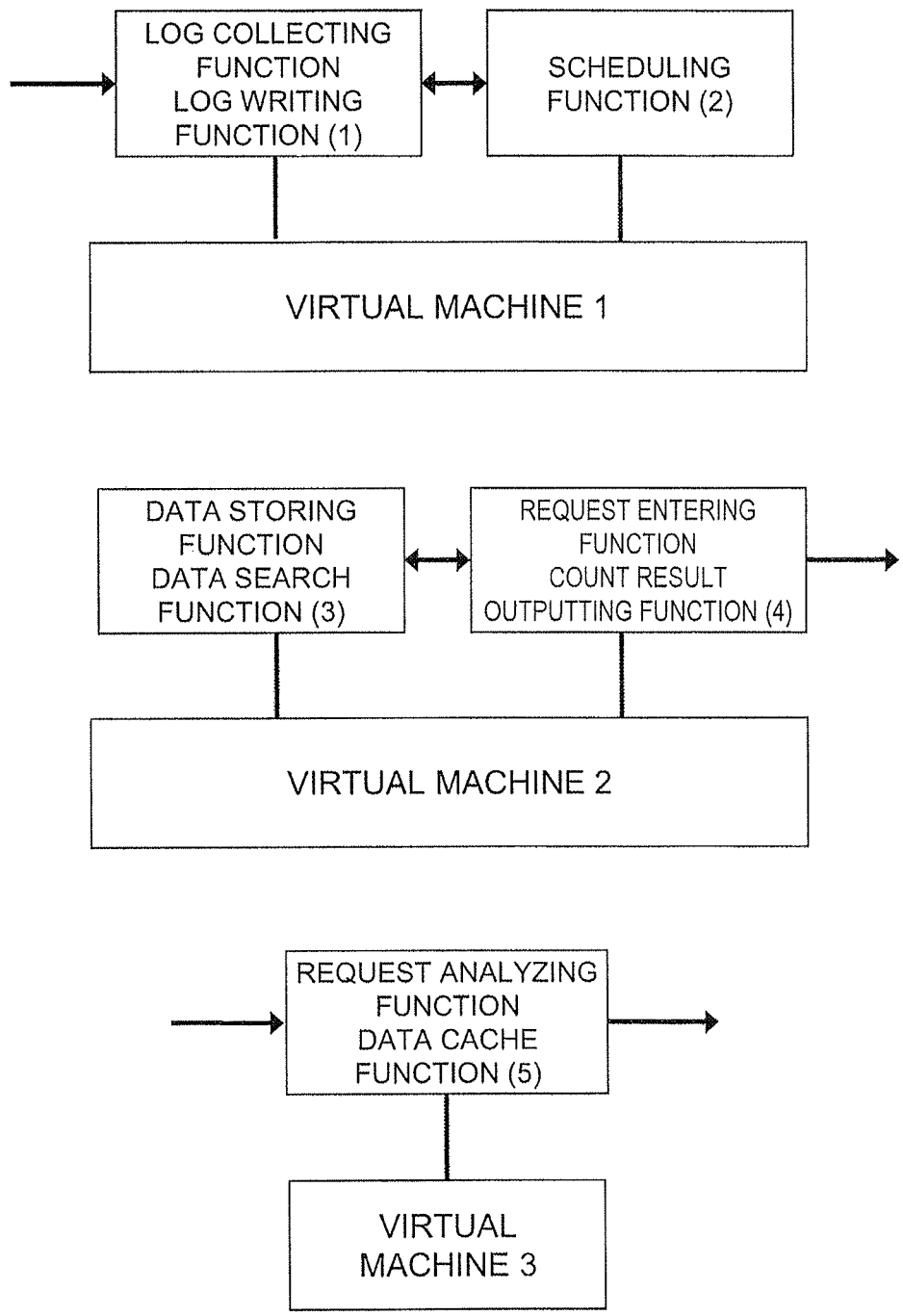
FIG. 10 is an architecture model diagram based on resource arrangement among virtual machines that uses the design matrix.

The following resource arrangement result, for example, is obtained as the post-rearrangement module configuration, and a design model diagram of FIG. 10 can be output. The obtained model diagram is presented on the interface as the need arises, or upon instruction from the architect, and is desirably linked with other pieces of information.

Virtual Machine 1: (1) log collecting function, log writing function, (2) scheduling function Virtual Machine 2: (3) data storing function, data search function, (4) request entering function, count result outputting function Virtual Machine 3: (5) request analyzing function, data cache function

*(1) to (5) represent individual modules.

The virtual machines given above are arranged next among physical machines in the third phase.

Here, aspects regarding performance and the like are input to the design aspect information entering unit 120 as follows:

Virtual Machines 1 to 3 take into consideration interference with virtual machines that are used for other services, and facilitate the determination of physical machines that actually run the virtual machines.

Virtual Machines 1 to 3 are separated from other application where disk IO is frequent.

These pieces of information are input as requirements of performance, and other requirements (regarding scalability, maintainability, and the like) are input as well. The aspects may be input at a suitable point, for example, at the start of the phase or during the preceding phase, or may be input additionally after the rearrangement.

Receiving the inputs of the information, the application architecture design device 100 runs the resource allocation design matrix displaying unit 170 to read design matrix information registered in the design information storing unit 130 and to display, for presentation to the architect, a resource allocation design matrix in a DSM format which shows, for each virtual machine, a physical machine where the individual virtual machine is allocated and run.

The resource allocation design matrix is adapted properly at this point, and the arrangement of Virtual Machines 1 to 3 among physical machines that reflects the requirements is calculated.

In the case of performing the calculation manually, the application architecture design device 100 receives the manipulation of the design matrix by the architect, recalculates the design matrix, and displays the resultant resource allocation design matrix in a suitable manner.

In the case of performing the calculation automatically, the application architecture design device 100 receives an input of rearrangement from the design matrix arrangement calculating unit 140, automatically recalculates the design matrix, and displays one or more resultant resource allocation design matrices.

The architect visually checks the pre-rearrangement design matrix and post-rearrangement design matrix output to the resource allocation design matrix displaying unit 170 as the need arises, to thereby visually check whether or not reviewing is necessary and whether or not the design is appropriate.

Figure 11:
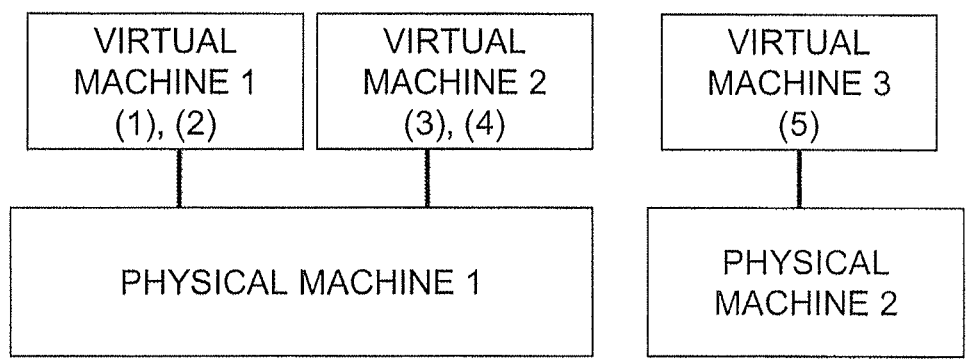
FIG. 11 is an architecture model diagram based on resource arrangement among physical machines that uses the design matrix.

The following arrangement plan, for example, is obtained as the post-rearrangement virtual machine arrangement configuration and a design model diagram of FIG. 11 can be output. The obtained model diagram is presented on the interface as the need arises, or upon instruction from the architect, and is desirably linked with other pieces of information.

Physical Machine 1: Virtual Machine 1, Virtual Machine 2

Physical Machine 2: Virtual Machine 3

By executing the respective phases up to this point, virtual machines and modules to be introduced to individual physical machines are derived in favored architecture as illustrated in FIG. 11.

An example of the interface (screen) presented to the architect is given next.

Figure 12:
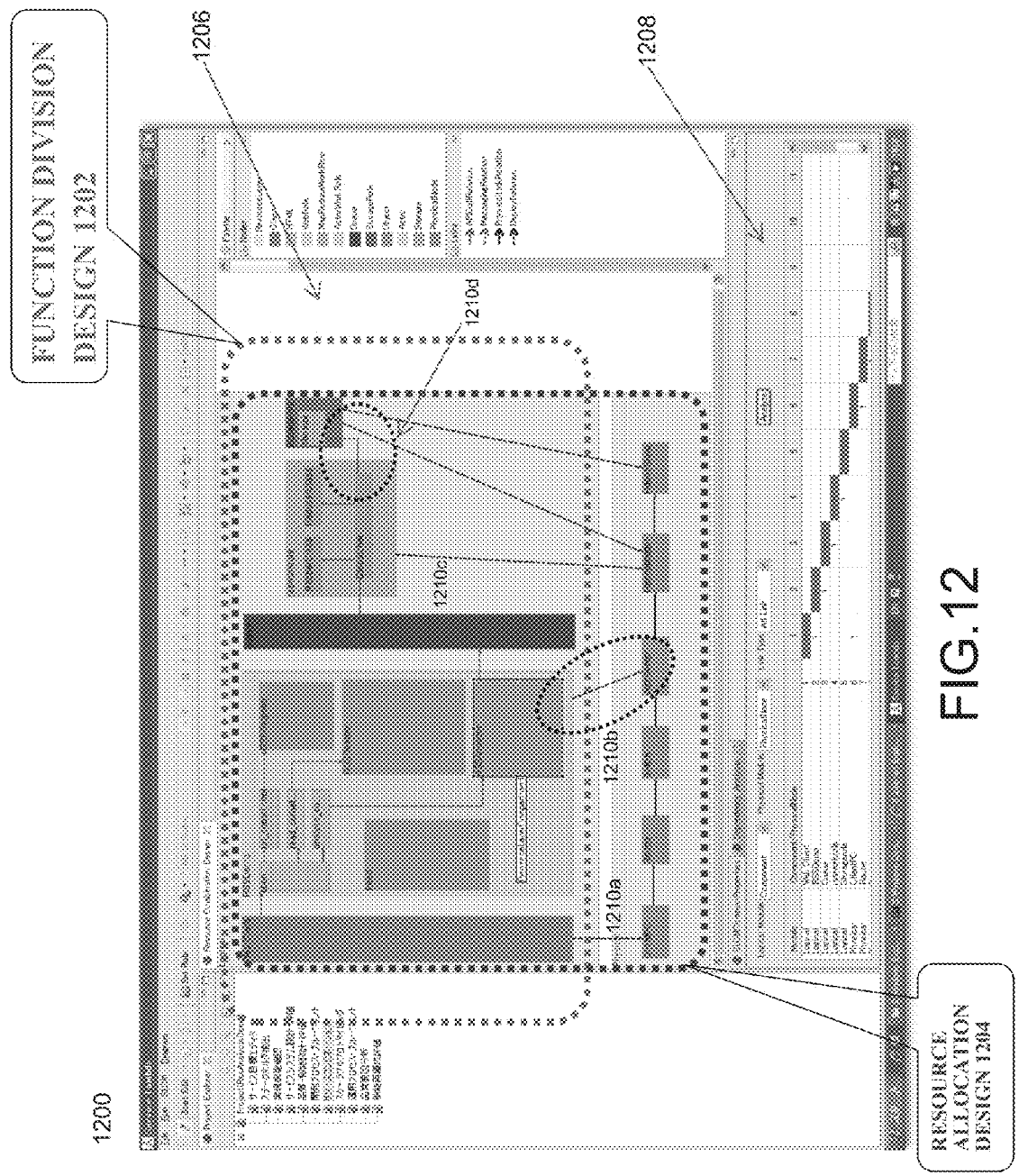
FIG. 12 is an explanatory diagram illustrating an example of an installed interface for displaying a model diagram.

FIG. 12 is an example of an interface 1200 for checking designed architecture. This example employs a screen configuration in which two model diagrams (1202 and 1204) that have been obtained through the three phases executed with the use of design matrices are displayed in an upper window 1206, and a selected part of a properly adapted design matrix is displayed in a lower window 1208. Exemplary interactions between elements of the interface are shown items 1210*a*, 1210*b*, 1210*c*, and 1210*d*. This invention is not limited to this interface, and pieces of information to be displayed at the same time are selected suitably by taking into consideration the operationality and convenience of the architect.

Figure 13:
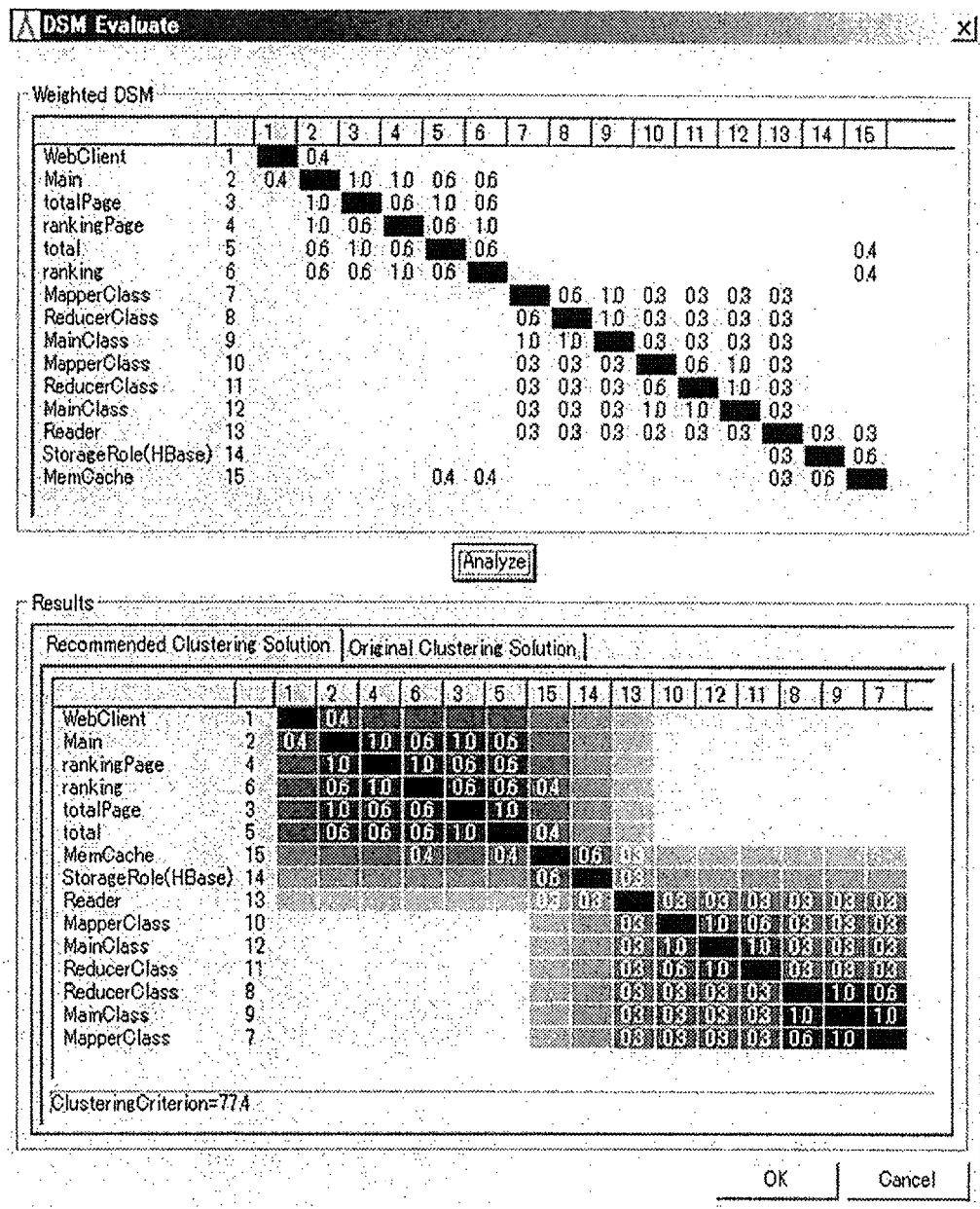
FIG. 13 is an explanatory diagram illustrating an example of an installed interface for displaying a DSM matrix.

FIG. 13 is an example of an interface that is used when automatic optimization of a design matrix is executed in the application architecture design device 100. In this example, the design matrix before adaptation is displayed in an upper window and the design matrix after adaptation is displayed in a lower window. An input from an operator is received via an "analyze" button, the design matrix calculating unit 140 adapts the design matrix properly, and the result thereof is displayed in the lower window. As understood from the figure, an excellent design solution is derived in which modules that have been existed individually before rearrangement are integrated by rearrangement. By reexamining the design based on the derived design solution, a better application design is accomplished in a virtualized environment or a cloud environment. In addition, during reexamination, various design aspects including performance, maintainability, and security that have been input as the design aspects can be checked visually and unitarily as indicated by density display (see the lower window) in the figure. An excellent design solution is thus derived efficiently.

As has been described, an application architecture design device to which this invention is applied is capable of deriving a better design solution for application architecture easily and uniformly in application designing in a virtualized environment or a cloud environment. The application architecture design device which uses design matrices is also useful in objective evaluation of architecture.

To give a concrete example, the application architecture design device makes it easy to define the scale of modules and determine allocated functions from the performance aspect of software functions. This is because the use of a properly adapted function module design matrix facilitates function division that takes performance into account.

Similarly, the module arrangement design matrix makes it easy to obtain a module arrangement method that satisfies scalability requirements and maintainability requirements.

Determining where to arrange applications (which geographical area or which data center to use) is also facilitated. This is because the resource allocation design matrix reveals dependency relations between virtual machines, thereby allowing an operation manager to find out which physical machine is suitable for running a virtual machine that is used in a cloud service, and facilitates planning.

The application architecture design device is also capable of automatically providing to a user a proper solution for designing/developing by rearranging rows/columns of each design matrix displayed in a DSM format. This automated presentation shows the module configuration of the application, the arrangement of modules among virtual machines, and the arrangement of virtual machines among physical machines that are based on input design aspect information and dependency relation and that take into consideration design aspects such as performance, maintainability, security, availability, and migratability in a desired manner. In addition, a plurality of model diagrams that reflect levels of importance assigned to the respective aspect are obtained with ease for the respective phases.

The units constituting the application architecture design device can be implemented by combining hardware and software. In the mode where hardware and software are combined, the application architecture design program is deployed in a RAM, and hardware such as a control unit (CPU) is run based on the program, thereby causing the units to function as the various means. This program may be recorded fixedly on a recording medium to be distributed. The program recorded on the recording medium is read onto a memory via a cable, wireless connection, or the recording medium itself to run the control unit and the like. Examples of the recording medium include an optical disc, a magnetic disc, a semiconductor memory device, and a hard disk.

Figure 14:
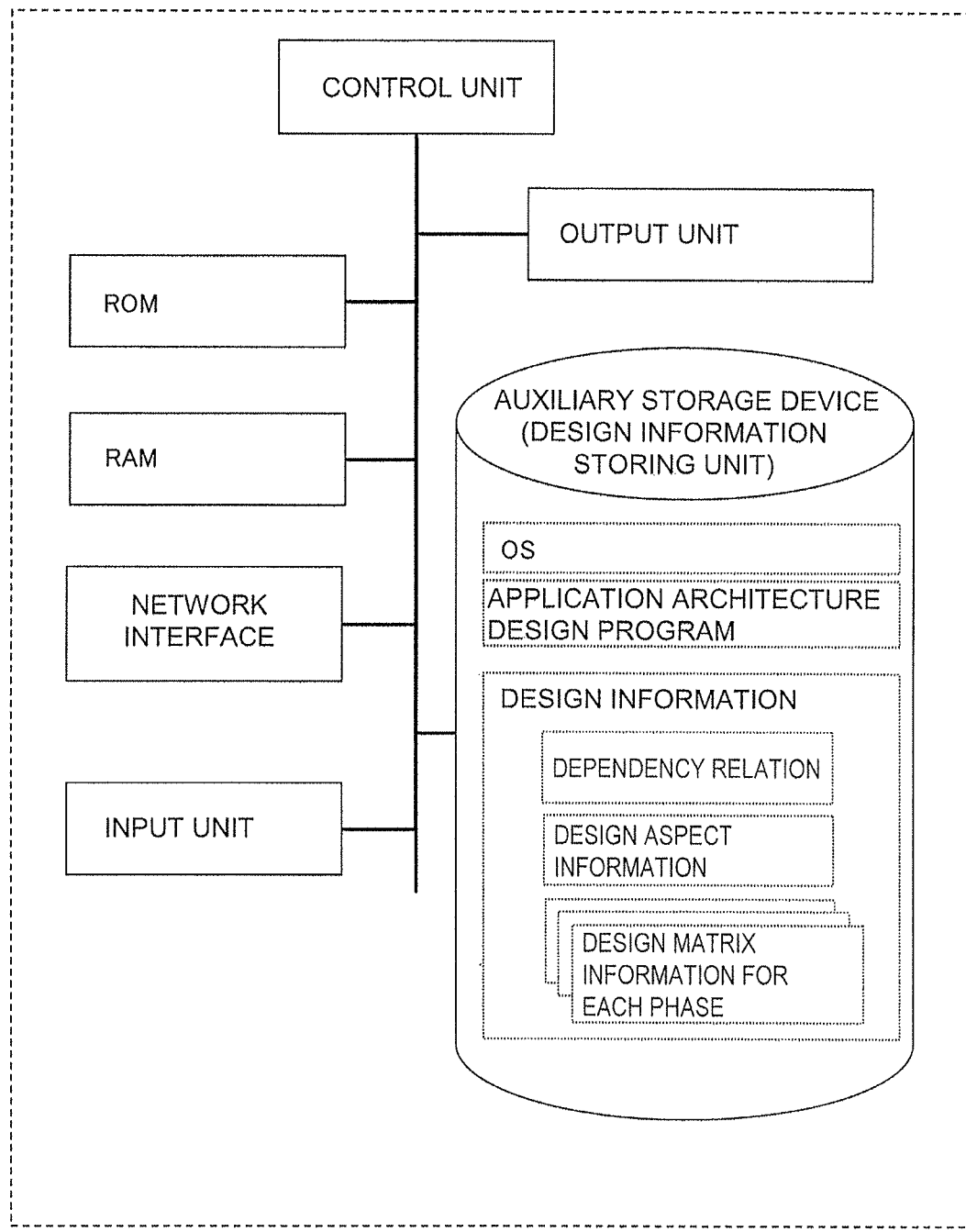
FIG. 14 is a configuration diagram illustrating an example of how this invention is embodied.
Figure 15:
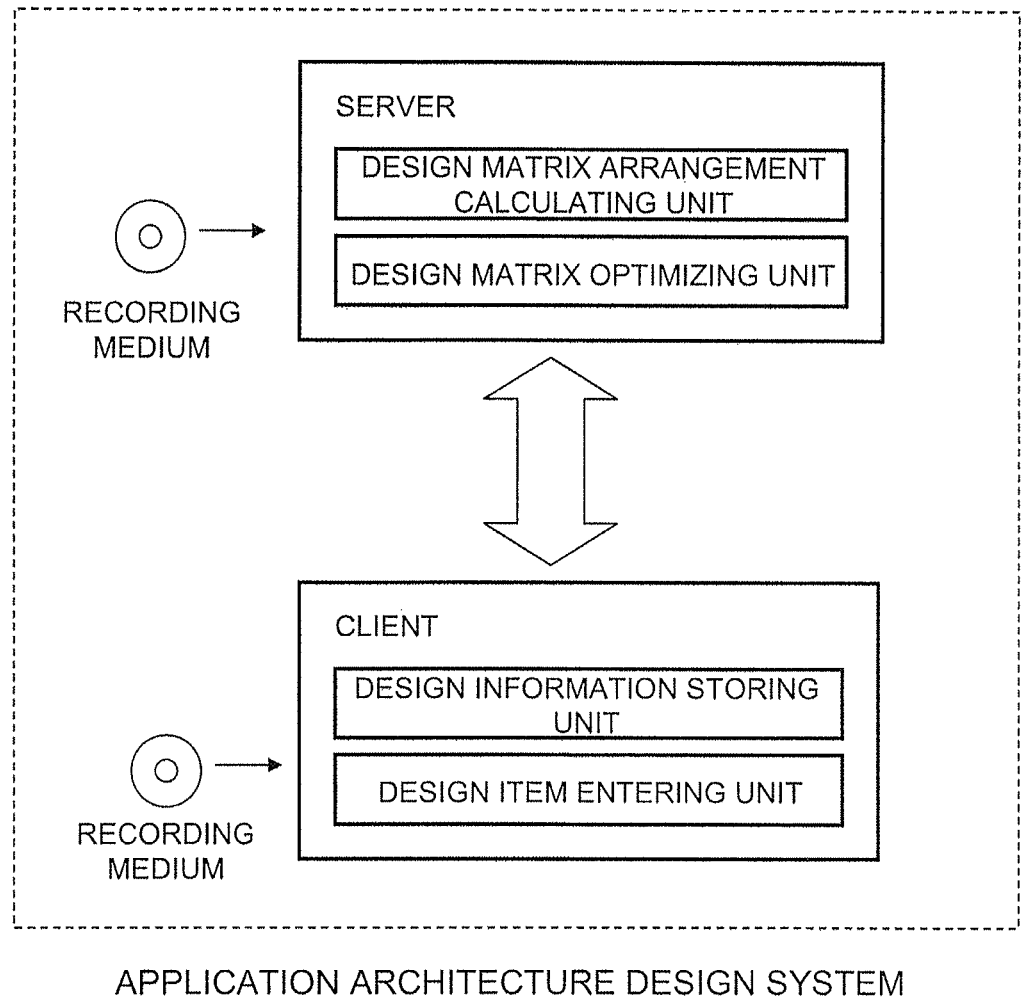
FIG. 15 is a configuration diagram illustrating another example of how this invention is embodied.
Figure 16:
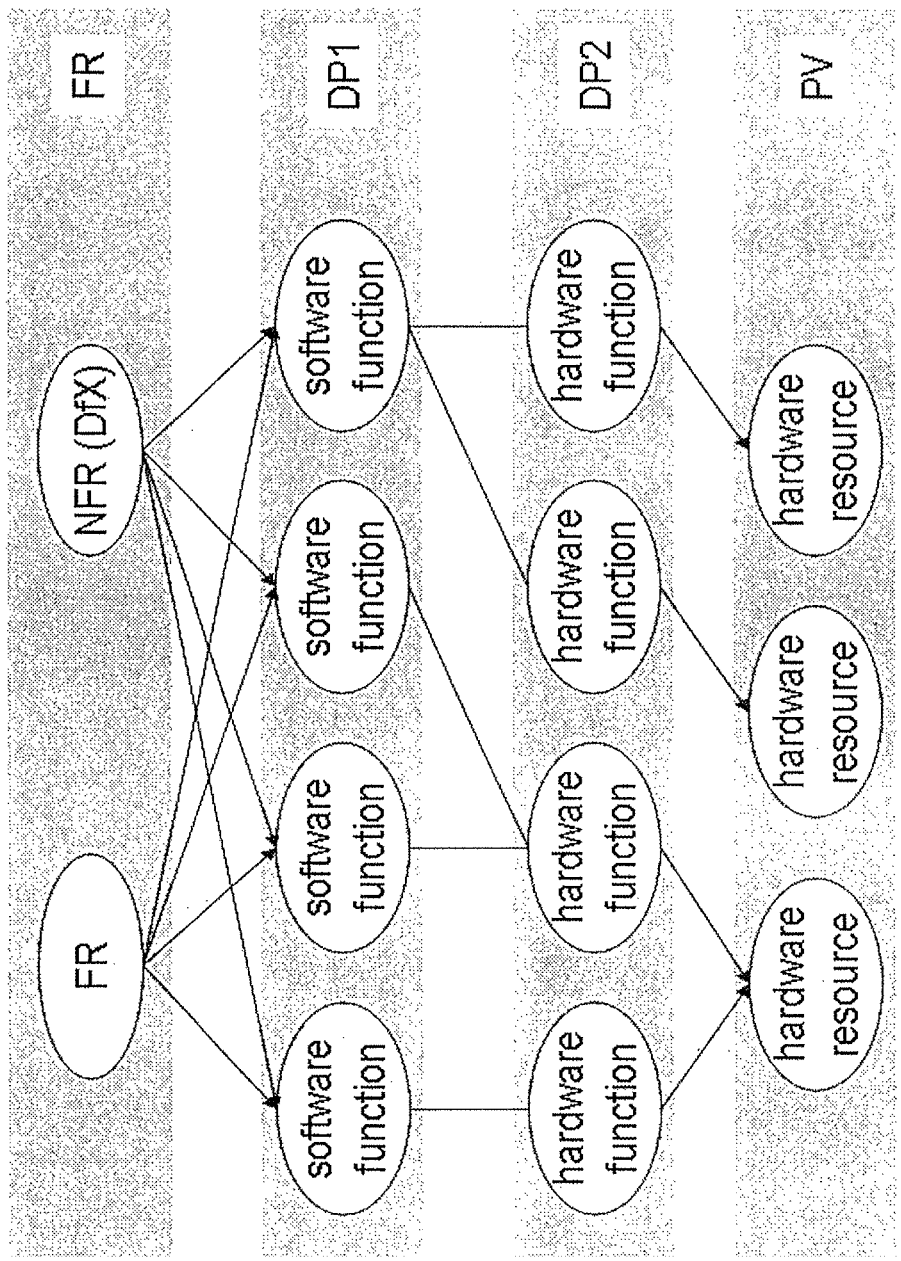
FIG. 16 is a model diagram illustrating application designing that is integrated into one model by applying the inventors' idea which is based on axiomatic design and DfX.

The application architecture design device may be built as a single computer or as a server-client system as illustrated in FIG. 14 and FIG. 15, respectively.

To paraphrase the embodiment described above, an information processing device that operates as an application architecture design device can be implemented by running a control unit as a dependency relation entering unit, a design aspect information entering unit, a design information storing unit, a design matrix arrangement calculating unit, a function module design matrix displaying unit, a module arrangement design matrix displaying unit, and a resource allocation design matrix displaying unit, based on an application architecture design program deployed in a RAM. This information processing device outputs, from an output unit (a printer or the like), pieces of design matrix information at various points in time which have been accumulated in the design information storing unit, along with various setting requirements. The information processing device may display on its screen three DSM matrices in which pieces of design matric information at three points in time—a function module design phase, a module arrangement design phase, and a resource allocation design phase—are associated and reflected. The information processing device may also display, in association with each of the DSM matrices, an architecture model diagram in which input dependency relations and design aspects are made into a model. The dependency relations and the design aspects may be corrected by manipulating the displayed model diagrams. These model diagrams are linked with the DSM format design matrices used in the respective stages, and the interface screen is desirably designed so that a pre-rearrangement design matrix and a post-rearrangement design matrix are displayed suitably. Executing these ensures that the level of importance set for each item that is input as a design aspect is even more effective in contributing to proper adaptation of an architecture design properly.

The concrete configuration of this invention is not limited to the embodiment described above, and modifications can be made without departing from the spirit of this invention.

According to this invention, which allows application designing that takes virtualization into consideration, an engineer who develops a system can design an excellent application module configuration, virtual arrangement, and physical arrangement suitable for an environment where servers and storage are virtualized.

In addition, a provider of a cloud service or the like can optimize how virtual machines are allocated in accordance with the characteristics of an application.

Further, a provider of a cloud service or the like finds it easy with this invention to determine which physical machine is to actually run a virtual machine while taking into consideration interference with virtual machines that are used for other services.

This application claims priority from Japanese Patent Application No. 2011-101106, filed on Apr. 28, 2011, the entire disclosure of which is incorporated herein by reference.

REFERENCE SIGNS LIST 100 application architecture design device (system)
110 dependency relation entering unit (dependency relation entering means)
120 design aspect information entering unit (design aspect information entering means)
130 design information storing unit (design information storing means)
140 design matrix arrangement calculating unit (design matrix arrangement calculating means)
150 function module design matrix displaying unit (function module design matrix displaying means)
160 module arrangement design matrix displaying unit (module arrangement design matrix displaying means)
170 resource allocation design matrix displaying unit (resource allocation design matrix displaying means)

The invention claimed is:

1. An application architecture design method, comprising the steps of:
inputting information about dependency relations and design aspects as input information, which are design items regarding modules for running functions that form an application program, virtual machines for running the modules, and physical machines for running the virtual machines; and
executing processing of adapting architecture properly by switching the input information in design matrices in a Dependency (Design) Structure Matrix (DSM) format, and thereby rearranging allocation of the modules, allocation of the virtual machines, and allocation of the physical machines in stages in the DSM format, to thereby output a design solution for architecture;
the method further comprising:
a dependency relation inputting step of inputting functions that constitute an application program operating in a distributed manner on a plurality of virtual machines, and information that indicates dependency relations between the functions;
a design aspect inputting step of inputting setting requirements for providing an application and information that indicates specifics of the requirements;
a design aspect storing step of receiving and storing the input information about the dependency relations and design aspects, and storing design matrix information, which is generated after rearrangement is finished for each;

a function module design matrix displaying step of displaying, in a DSM format, a function-module design matrix, which reflects an association relation between a function allocated to a module and the module to which the function is allocated, as design matrix information where the information about the dependency relations and the information about the design aspects are input items, and receiving an input of rearrangement of the function-module design matrix to output the design matrix information on which processing of reflecting the rearrangement has been performed;

a module arrangement design matrix displaying step of displaying, in a DSM format, a module arrangement design matrix, which has the design matrix information as an input and indicates, for each module, a virtual machine where the each module operates, and receiving an input of rearrangement of the module arrangement design matrix to output the design matrix information on which processing of reflecting the rearrangement has been performed; and a resource allocation design matrix displaying step of displaying, in a DSM format, a resource allocation design matrix, which has the design matrix information as an input and indicates, for each virtual machine, a physical machine where the each virtual machine is allocated and run, and receiving an input of rearrangement of the resource allocation design matrix to output the design matrix information on which processing of reflecting the rearrangement has been performed, wherein the design information storing step comprises:
using function module design matrix information, which is generated after the function module design matrix displaying step is finished, as input information for displaying the module arrangement design matrix;

using module arrangement design matrix information, which is generated after the module arrangement design matrix displaying step is finished, as input information for displaying the resource allocation design matrix; and linking the function-module design matrix, the module arrangement design matrix, and the resource allocation design matrix in stages.

2. An application architecture design method according to claim 1, further comprising a design matrix arrangement calculating step of automatically calculating a proper solution for designing/development based on the rearrangement of rows/columns of each of the function-module design matrix, the module arrangement design matrix, and the resource allocation design matrix displayed in a DSM format.

3. An application architecture design method according to claim 1, wherein information indicating a level of importance is assigned to each item of the design aspects, and adaptation based on the level of importance is visualized in a manner that allows a comparison with other items in the design matrices in the DSM format.

4. An application architecture design method according to claim 1, wherein when the design matrices in the DSM format are displayed in the respective steps, an interface screen is output so that the design matrix before the rearrangement and the design matrix after the rearrangement are comparable.

5. An application architecture design method according to claim 1, wherein in response to the rearrangement of the design matrices in the DSM format in the respective steps, an interface screen is output that shows a model diagram based on the design matrix after the rearrangement.

6. An application architecture design system, comprising:
an entering unit for inputting information about dependency relations and design aspects as input information, which are design items regarding modules for running functions that form an application program, virtual machines for running the modules; and physical machines for running the virtual machines; and a design matrix optimizing unit to execute processing of adapting architecture properly by allowing switching of the input information in matrices in a Dependency (Design) Structure Matrix (DSM) format, and thereby rearranging allocation of the modules, allocation of the virtual machines, and allocation of the physical machines in stages in the DSM format, and to output a result;

the system further comprising:
a dependency relation entering unit for inputting functions that constitute an application program operating in a distributed manner on a plurality of virtual machines, and information that indicates dependency relations between the functions;

a design aspect entering unit for inputting setting requirements for providing an application and information that indicates specifics of the setting requirements;

a design information storing unit to receive and stories the input information about the dependency relations and design aspects, and storing design matrix information, which is generated after rearrangement is finished for each;

a function module design matrix displaying unit to display in a DSM format, a function-module design matrix, which reflects an association relation between a function allocated to a module and the module to which the function is allocated, as design matrix information where the information about the dependency relations and the information about the design aspects are input items, and receiving an input of rearrangement of the function-module design matrix to output the design matrix information on which processing of reflecting the rearrangement has been performed;

a module arrangement design matrix displaying unit to display in a DSM format, a module arrangement design matrix, which has the design matrix information as an input and indicates, for each module, a virtual machine where the each module operates, and receiving an input of rearrangement of the module arrangement design matrix to output the design matrix information on which processing of reflecting the rearrangement has been performed; and a resource allocation design matrix displaying unit to display in a DSM format, a resource allocation design matrix, which has the design matrix information as an input and indicates, for each virtual machine, a physical machine where the each virtual machine is allocated and run, and receiving an input of rearrangement of the resource allocation design matrix to output the design matrix information on which processing of reflecting the rearrangement has been performed;

wherein the information stored in the design information storing unit is used so that:
function module design matrix information, which is generated after the function module design matrix displaying phase is finished, is used as input information for displaying the module arrangement design matrix;

module arrangement design matrix information, which is generated after the module arrangement design matrix displaying phase is finished, is used as input information for displaying the resource allocation design matrix; and the function-module design matrix, the module arrangement design matrix, and the resource allocation design matrix are linked in stages.

7. An application architecture design system according to claim 6, further comprising a design matrix arrangement calculating unit for automatically calculating a proper solution for designing/development by rearranging rows/columns of each of the function-module design matrix, the module arrangement design matrix, and the resource allocation design matrix displayed in a DSM format.

8. An application architecture design system according to claim 6, wherein information indicating a level of importance is received for each item of the design aspects, and adaptation based on the level of importance is visualized in a manner that allows a comparison with other items in the design matrices in the DSM format.

9. An application architecture design system according to claim 6, wherein when the design matrices in the DSM format are displayed in the respective phase, an interface screen is output so that the design matrix before the rearrangement and the design matrix after the rearrangement are comparable.

10. An application architecture design system according to claim 6, wherein in response to the rearrangement of the design matrices in the DSM format in the respective phases, an interface screen is output that shows a model diagram based on the design matrix after the rearrangement.

11. A non-transitory computer readable recording medium having recorded thereon a program for causing a control unit of an information processing system to operate as:

entering unit for inputting information about dependency relations and design aspects, which are design items regarding modules for running functions that form an application program, virtual machines for running the modules, and physical machines for running the virtual machines; and design matrix optimizing unit to execute processing of adapting architecture properly by allowing switching of the input information in matrices in a Dependency (Design) Structure Matrix (DSM) format, and thereby rearranging allocation of the modules, allocation of the virtual machines, and allocation of the physical machines in stages in the DSM format, and to output a result;

the program further causing the control unit to operate as:

a dependency relation entering unit for inputting functions that constitute an application program operating in a distributed manner on a plurality of virtual machines, and information that indicates dependency relations between the functions;

a design aspect entering unit for inputting setting requirements for providing an application and information that indicates specifics of the setting requirements;

a design information storing unit to receive and stories the input information about the dependency relations and design aspects, and storing design matrix information, which is generated after rearrangement s finished for each;

a function module design matrix displaying unit to display in a DSM format, a function-module design matrix, which reflects an association relation between a function allocated to a module and the module to which the function is allocated, as design matrix information where the information about the dependency relations and the information about the design aspects are input items, and receiving an input of rearrangement of the function-module design matrix to output the design matrix information on which processing of reflecting the rearrangement has been performed;

a module arrangement design matrix displaying unit to display in a DSM format, a module arrangement design matrix, which has the design matrix information as an input and indicates, for each module, a virtual machine where the each module operates, and receiving an input of rearrangement of the module arrangement design matrix to output the design matrix information on which processing of reflecting the rearrangement has been performed; and a resource allocation design matrix displaying unit to display in a DSM format, a resource allocation design matrix, which has the design matrix information as an input and indicates, for each virtual machine, a physical machine where the each virtual machine is allocated and run, and receiving an input of rearrangement of the resource allocation design matrix to output the design matrix information on which processing of reflecting the rearrangement has been performed;

wherein the information stored in the design information storing unit is used so that:

function module design matrix information, which is generated after the function module design matrix displaying phase is finished, is used as input information for displaying the module arrangement design matrix;

module arrangement design matrix information, which is generated after the module arrangement design matrix displaying phase is finished, is used as input information for displaying the resource allocation design matrix; and the function-module design matrix, the module arrangement design matrix, and the resource allocation design matrix are linked in stages.

12. A non-transitory computer readable recording medium having recorded thereon a program according to claim 11, wherein the program further causes the control unit to operate as a design matrix arrangement calculating unit for automatically calculating a proper solution for designing/development by rearranging rows/columns of each of the function-module design matrix, the module arrangement design matrix, and the resource allocation design matrix displayed in a DSM format.

13. A non-transitory computer readable recording medium having recorded thereon a program according to claim 11, wherein information indicating a level of importance is received for each item of the design aspects, and adaptation based on the level of importance is visualized in a manner that allows a comparison with other items in the design matrices in the DSM format.

14. A non-transitory computer readable recording medium having recorded thereon a program according to claim 11, wherein when the design matrices in the DSM format are displayed in the respective phases, an interface screen is output so that the design matrix before the rearrangement and the design matrix after the rearrangement are comparable.

15. A non-transitory computer readable recording medium having recorded thereon a program according to claim 11, wherein in response to the rearrangement of the design matrices in the DSM format in the respective phases, an interface screen is output that shows a model diagram based on the design matrix after the rearrangement.

16. A non-transitory computer readable recording medium having recorded thereon a program for causing a control unit to operate as:
- a dependency relation entering unit for inputting functions that constitute an application program operating in a distributed manner on a plurality of virtual machines, and information that indicates dependency relations between the functions;
- a design aspect entering unit for inputting setting requirements for providing an application and information that indicates specifics of the setting requirements;
- a design information storing unit to receive and store the input information about the dependency relations and design aspects, and storing design matrix information, which is generated after rearrangement is finished for each;
- a function module design matrix displaying unit to display; in a Dependency (Design) Structure Matrix (DSM) format, a function-module design matrix, which reflects an association relation between a function allocated to a module and the module to which the function is allocated, as design matrix information where the information about the dependency relations and the information about the design aspects are input items, and receiving an input of rearrangement of the function-module design matrix to output the design matrix information on which processing of reflecting the rearrangement has been performed;
- a module arrangement design matrix displaying unit to display, in a DSM format, a module arrangement design matrix, which has the design matrix information as an input and indicates, for each module, a virtual machine where the each module operates, and receiving an input of rearrangement of the module arrangement design matrix to output the design matrix information on which processing of reflecting the rearrangement has been performed; and
- a resource allocation design matrix displaying unit to display, in a DSM format, a resource allocation design matrix, which has the design matrix information as an input and indicates, for each virtual machine, a physical machine whereby each virtual machine is allocated and run, and receiving an input of rearrangement of the resource allocation design matrix to output the design matrix information on which processing of reflecting the rearrangement has been performed;
- wherein the program further causes the control unit to operate to use the information stored in the design information storing unit so that:
- function module design matrix information, which is generated after the function module design matrix displaying phase is finished, is used as input information for displaying the module arrangement design matrix;
- module arrangement design matrix information, which is generated after the module arrangement design matrix displaying phase is finished, is used as input information for displaying the resource allocation design matrix; and
- the function-module design matrix, the module arrangement design matrix, and the resource allocation design matrix are linked in stages.

\* \* \* \* \*